3,637,819
PROCESS FOR THE MANUFACTURE OF UNSATURATED ESTERS OF CARBOXYLIC ACIDS

Kurt Sennewald and Wilhelm Vogt, Knapsack, near Cologne, Heinz Erpenbach, Surth, near Cologne, Hermann Glaser, Knapsack, near Cologne, and Helmut Dyrschka, Kottingen, Germany, assignors to Knapsack Aktiengesellschaft, Knapsack, near Cologne, Germany
No Drawing. Filed Dec. 5, 1968, Ser. No. 781,626
Claims priority, application Germany, Dec. 30, 1967, P 16 68 352.6
Int. Cl. C07c 67/04
U.S. Cl. 260—497 A                    10 Claims

ABSTRACT OF THE DISCLOSURE

Production of unsaturated esters of carboxylic acids by reaction of an olefinic compound and an aliphatic or aromatic carboxylic acid, which each contain from 2 to 20 carbon atoms, with molecular oxygen, or air, in the gas phase, at elevated temperature and in contact with a carrier catalyst, the reaction being carried out in contact with a carrier catalyst containing palladium acetate, alkali metal acetate and one or more vanadium compounds as its active constituents, the dry, powdery carrier catalyst being irradiated with ultraviolet and/or visible light, prior to using it.

---

It is known that unsaturated esters of carboxylic acids can be produced by reaction of an olefinic compound and an aliphatic or aromatic carboxylic acid with molecular oxygen or air in the gas phase, at elevated temperature, and in contact with a carrier catalyst containing one or more compounds of ruthenium, rhodium, palladium, osmium, iridium or platinum, if desired in combination with one or more compounds of copper, silver, gold, zinc, cadmium, tin, lead, chromium, molybdenum, tungsten, manganese, iron, cobalt, nickel, vanadium, cerium, antimony, mercury or titanium, and in further combination with one or more alkali metal or alkaline earth metal carboxylates. Reference is made in this connection to German published specification 1,191,366. The reaction occurs in accordance with the known summation equation:

in which R, R' and R" stand for hydrogen or aliphatic, cycloaliphatic or aromatic radicals containing up to 17 carbon atoms. For example, the technically very interesting product vinyl acetate can be produced by reaction of ethylene, acetic acid and oxygen.

In view of the high price of the catalysts, which is incurred by their noble metal content, it is highly desirable for the economic use of the process to have a catalyst which combines long lifetime with good space/time yields, and produces generally good yields.

The present invention now provides a process for the manufacture of unsaturated esters of carboxylic acids by reaction of an olefinic compound and an aliphatic or aromatic carboxylic acid, which each contain from 2 to 20 carbon atoms, with molecular oxygen or air, in the gas phase, at elevated temperature and in contact with a carrier catalyst, which process comprises carrying out the reaction in contact with a carrier catalyst containing palladium acetate, alkali metal acetate and one or more compounds of vanadium as its active constituents, the dry, powdery catalyst being irradiated with actinic light, i.e. ultraviolet and/or visible light, prior to using it.

The carrier catalyst can contain silicic acid, kieselguhr, silica gel, diatomaceous earth, aluminum oxide, aluminum silicate, aluminum phosphate, pumice, silicon carbide, asbestos or active carbon as the carrier material, and between 0.1 and 20, preferably between 0.2 and 10% by weight palladium acetate, between 0.1 and 20, preferably between 0.2 and 10% by weight alkali metal acetate, and between 0.1 and 10, preferably between 0.2 and 8% by weight of one or more vanadium compounds as the active constituents, alkali metal vanadate being particularly preferred.

The olefinic compound containing from 2 to 20 carbon atoms is preferably an aliphatic or cycloaliphatic olefin or diolefin, more preferably ethylene, propylene, butene, butadiene, pentene, cyclopentadiene, cyclohexene or cyclohexadiene, and the carboxylic acid containing from 2 to 20 carbon atoms is preferably acetic acid, propionic acid, butyric acid, isobutyric acid, valeric acid, lauric acid, palmitic acid, stearic acid or benzoic acid.

The catalyst is produced by impregnating the carrier with an aqueous, acetic acid solution of palladium acetate, the vanadium compounds, e.g. potassium vanadate, and alkali metal acetate. A particularly advantageous variant of producing the catalyst comprises impregnating one of the above carriers with an acetic acid solution of palladium acetate and alkali metal acetate, drying the carrier so impregnated, and impregnating it again, this time with an alkaline solution of vanadium pentoxide. After having been impregnated, the catalyst is dried in a vacuum drying cabinet at about 50° C. The catalyst spread out, for example, in a thin layer, which is repeatedly turned, is then activated by irradiation with actinic light, i.e. ultraviolet and/or visible light, for a period of time between 30 minutes and 10 hours. In order to produce an effect, it is generally necessary for the catalyst to absorb per liter a quantity of light between 0.1 and 100, preferably between 1 and 50 watt-hours. A catalyst so treated enables the space/time-yield obtainable therewith to be increased by at least 50%, as compared with the space/time yield obtainable with an unexposed catalyst. The catalyst treated in the manner described above is placed in a stainless steel tube and a gas mixture consisting of the olefin to undergo reaction, carboxylic acid in vapor form and oxygen is passed over it at temperatures between 120 and 250° C., preferably between 150 and 200° C., and under pressures between 0.5 and 20, preferably between 2 and 10, atmospheres absolute. The reaction mixture leaving the reactor is condensed to isolate the reaction products and recover unreacted carboxylic acid. For example, the reaction of ethylene as the olefin with acetic acid as the carboxylic acid at 180° C. and under a pressure of 6 atmospheres absolute in contact with a palladium acetate/potassium vanadate/potassium acetate-catalyst on a silicic acid carrier has been found to produce the following results: a space/time yield of 80 grams vinyl acetate per liter of catalyst per hour for the unexposed catalyst, and a space/time yield of 120 grams vinyl acetate per liter of catalyst per hour, for the irradiated catalyst.

EXAMPLE 1

(Comparative Example)

1 liter of a silicic acid carrier, which had a BET-surface of 120 square meters/gram and an apparent density of 0.52 kg./liter, was impregnated with a solution of 7.8 grams palladium acetate and 20 grams potassium acetate in 800 cc. pure acetic acid. The carrier was found practically to absorb the whole amount of liquid. The carrier so impregnated was dried in vacuo at 50° C. and was then ready for use. The carrier catalyst so made contained 1.5% by weight palladium acetate and 3.85% by weight potassium acetate.

The catalyst was placed in a stainless steel tube 25 mm. wide, which was heated by means of a steam jacket and provided with a temperature control device. A mixture of 750 grams/hr. acetic acid in vapor form, 750 normal liters/hr. (measured at N.T.P.) ethylene and 450 normal liters/hr. air was passed over the catalyst at a temperature of 180° C. and under a pressure of 6 atmospheres absolute. The reaction gas was cooled using water and a freezing mixture to condense out the reaction product and unreacted acetic acid. The analysis of the reaction mixture indicated a space/time yield of 50 grams vinyl acetate per liter of catalyst per hour.

EXAMPLE 2

1 liter of the catalyst carrier material of Example 1 was impregnated with a solution of 7.8 grams palladium acetate and 20 grams potassium acetate in acetic acid. The solution was used in a quantity just sufficient to permit absorption thereof by the catalyst mass. The catalyst mass so impregnated was dried in vacuo at 50° C. and introduced later in a solution containing 3.15 grams vanadium pentoxide, which had been dissolved in the necessary amount of potassium hydroxide. The catalyst was then dried in a rotary evaporator at 50° C. and under reduced pressure. The catalyst so made was found to contain 1.5% by weight palladium acetate, 3.85% by weight potassium acetate and 0.6% by weight $V_2O_5$ in the form of potassium vanadate. It was immediately placed in the reaction furnace without any further treatment. Under the conditions described in Example 1, the catalyst was found to produce a space/time yield of 80 grams vinyl acetate per liter of catalyst per hour, for a yield of substantially 88%, referred to the ethylene transformed. The catalytic activity could not be found to have died down, after an operation period of 4 weeks.

EXAMPLE 3

The dried catalyst of Example 2 was irradiated for substantially 6 hours using a 700 watt ultraviolet lamp, at a distance of 60 cm. Under otherwise the same conditions, the catalyst so activated was found to produce a space/time yield of 120 grams vinyl acetate per liter of catalyst per hour, for a yield of 90%, referred to the ethylene transformed. The catalytic activity could not be found to have died down, after an operation period of 4 weeks.

What is claimed is:

1. A process for the manufacture of vinyl esters of carboxylic acids by reaction of ethylene with a member selected from the group consisting of aliphatic and aromatic carboxylic acids containing from 2 to 20 carbon atoms, with molecular oxygen or air, in the gas phase, at elevated temperature and in contact with a carrier catalyst, which comprises carrying out the reaction in contact with a catalyst consisting essentially of palladium acetate, alkali metal acetate and alkali metal vanadate deposited on a carrier, the dry, powdery catalyst being irradiated with actinic light, prior to using it.

2. In a process for the manufacture of a carboxylic acid vinyl ester which comprises reacting ethylene and an aliphatic or aromatic carboxylic acid containing from 2 to 20 carbon atoms with oxygen in the gaseous phase at elevated temperature, the improvement which comprises carrying out the reaction by contacting the reactants with an actinically irradiated catalyst consisting essentially of palladium acetate, an alkali metal acetate and an alkali metal vanadate deposited on a carrier.

3. The process defined in claim 2 wherein the carboxylic acid reactant is acetic acid and the product is vinyl acetate.

4. The process of claim 1, wherein the carrier is selected from the group consisting of silicic acid, kieselguhr, silica gel, diatomaceous earth, aluminum oxide, aluminum silicate, aluminum phosphate, pumice, silicon carbide, asbestos and active carbon.

5. The process of claim 1, wherein the catalyst consists essentially of between 0.1 and 20% by weight palladium acetate, between 0.1 and 20% by weight alkali metal acetate and between 0.1 and 10% by weight of alkali metal vanadate deposited on a carrier.

6. The process of claim 1, wherein the catalyst consists essentially of between 0.2 and 10% by weight palladium acetate, between 0.2 and 10% by weight alkali metal acetate, and between 0.2 and 8% by weight of alkali metal vanadate deposited on a carrier.

7. The process of claim 1, wherein the alkali metal vanadate is potassium vanadate.

8. The process of claim 1, wherein the catalyst is irradiated with ultraviolet light.

9. The process of claim 1, wherein the catalyst is irradiated with visible light.

10. The process of claim 1, wherein the catalyst is irradiated with ultraviolet and visible light.

References Cited

UNITED STATES PATENTS

| 3,274,238 | 9/1966 | Kojer et al. | 260—497 |

FOREIGN PATENTS

| 1,003,347 | 9/1965 | Great Britain | 260—497 |
| 1,017,938 | 6/1966 | Great Britain | 260—497 |
| 1,029,319 | 5/1966 | Great Britain | 260—497 |
| 1,117,595 | 6/1968 | Great Britain | 260—497 |
| 1,146,707 | 3/1969 | Great Britain | 260—497 |

LORRAINE, A. WEINBERGBER, Primary Examiner

R. D. KELLY, Assistant Examiner

U.S. Cl. X.R.

252—411 R, 456; 260—410.9 N, 476 R